R. W. BAKER.
LOCK NUT.
APPLICATION FILED MAR. 29, 1917.

1,296,038.

Patented Mar. 4, 1919.

INVENTOR
Robert W Baker
BY
[signature]
ATTORNEY

UNITED STATES PATENT OFFICE.

ROBERT WILLIAM BAKER, OF BLANCHARD, WASHINGTON.

LOCK-NUT.

1,296,038.  Specification of Letters Patent.  Patented Mar. 4, 1919.

Application filed March 29, 1917. Serial No. 158,474.

*To all whom it may concern:*

Be it known that I, ROBERT W. BAKER, citizen of the United States, residing at Blanchard, in the county of Snohomish and State of Washington, have invented certain new and useful Improvements in Lock-Nuts, of which the following is a specification.

This invention relates to improvements in lock nuts and has for its principal object, to provide an improved and novel form of lock nut arrangement for use with threaded bolts.

Other objects will appear as my invention is more fully explained in the following specification, illustrated in the accompanying drawings and pointed out in the appended claim.

Figure 3:
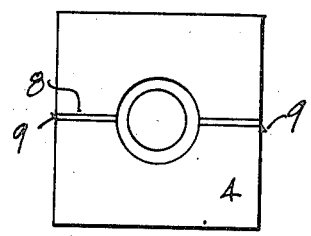
Figure 2:
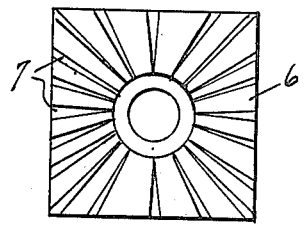
Figure 1:
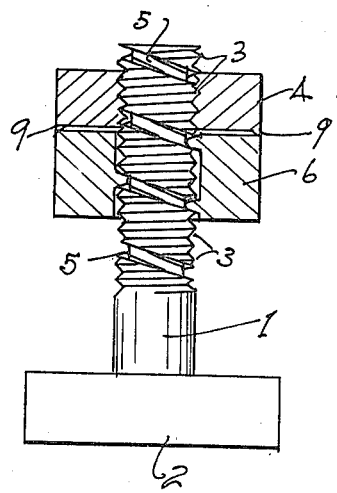

In the drawings, Figure 1 is a side elevation of my device with parts broken away. Fig. 2 is a plan view of the nut for the bolt. Fig. 3 is a bottom view of the lock nut.

Referring more particularly to the drawings, numeral 1 indicates a bolt having a head 2. Bolt 1 is threaded right handedly with threads 3. The threads 3 coöperate with similar threads in a lock nut 4. The bolt 1 is also provided with coarse and deeply cut left hand threads 5 which coöperate with similar threads in a nut 6. The upper face of nut 6 is provided with radial indentations 7 and the adjacent face of nut 4 is provided with a raised barb 8 and corner projections 9. It will be understood that the nut 4 is made of soft material and that when screwed down tightly against nut 6, the barb 8 and corners 9 will deform themselves against the radial notches 7 in nut 6. The tendency of nut 6 is to unscrew in a direction opposite to that of lock nut 4 and in this way, will tighten itself against the nut 4 and prevent loosening.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is—

In a device of the class described the combination of a bolt provided with a fine thread and a coarse oppositely disposed deeply cut thread, a coarsely threaded nut which engages the coarse threads on the bolt, the outer face of the coarsely threaded nut having a series of lateral notches, and a lock nut which is of much softer material than the other nut, and which engages the finely cut threads on the bolt, the inner face of the lock nut having a barb which engages the lateral notches in the coarsely threaded nut, whereby when the faces of the two nuts are screwed up to engage each other, the barb deforms itself against the walls of the lateral notches and prevents retrograde movement of the nuts with respect to each other.

In testimony whereof I affix my signature in the presence of two witnesses:

ROBERT WILLIAM BAKER.

Witnesses:
Mrs. J. F. THORNTON,
J. F. THORNTON.